United States Patent [19]
Asprey

[11] 3,989,808
[45] Nov. 2, 1976

[54] METHOD OF PREPARING PURE FLUORINE GAS

[75] Inventor: Larned B. Asprey, Los Alamos, N. Mex.

[73] Assignee: The United States of America as represented by the United States Energy Research and Development Administration, Washington, D.C.

[22] Filed: July 28, 1975

[21] Appl. No.: 599,443

[52] U.S. Cl. .............................. 423/503; 423/500; 423/504
[51] Int. Cl.² .......................................... C01B 7/20
[58] Field of Search ..................... 423/503, 504, 500

[56] References Cited
UNITED STATES PATENTS
3,324,016  6/1967  Langer ............................ 423/504 X FOREIGN PATENTS OR APPLICATIONS
825,185  12/1959  United Kingdom ................. 423/500

OTHER PUBLICATIONS
J. W. Mellor's, "A Comprehensive Treatise on Inorg. & Theo. Chem.," vol. 15, 1936, p. 405, Longmans, Green & Co., N.Y.

Primary Examiner—Edward Stern
Attorney, Agent, or Firm—Dean E. Carlson; Paul D. Gaetjens

[57] ABSTRACT

A simple, inexpensive system for purifying and storing pure fluorine is described. The method utilizes alkali metal-nickel fluorides to absorb tank fluorine by forming nickel complex salts and leaving the gaseous impurities which are pumped away. The complex nickel fluoride is then heated to evolve back pure gaseous fluorine.

1 Claim, No Drawings

METHOD OF PREPARING PURE FLUORINE GAS

BACKGROUND OF THE INVENTION

1. Field of the Invention

Commercially available tank fluorine gas contains 1–2% by volume of impurities. These consist primarily of nitrogen and oxygen. Various amounts of fluocarbons and chlorofluocarbons are also present. In addition, silicon tetrafluoride is usually present in varying amounts. A number of sulfur-containing fluorine compounds have also been shown to be present in small amounts. Almost without exception, hydrogen fluoride is found to be present. It is common practice to remove this by passage over sodium fluoride.

For most synthetic purposes, 98–99% pure fluorine is adequate. The inventor has found, however, that in some transition metal fluoride preparations an appreciable amount of oxyfluoride is formed using tank $F_2$. Another problem with impure fluorine is found when isotopically-substituted oxygen and nitrogen are introduced into the molecule. Some years ago the inventor and his associates prepared nitrosyl fluoride, ONF with > 95% pure $^{15}N^{18}O$. Infrared inspection showed, however, that there was scrambling due to $^{14}N$ and $^{16}O$ present in the $F_2$ and actually obtained a preparation with approximately equal proportions of the four possible species. In that case, there was no overlapping so no harm was done, but such is not always the case. Where new compounds are being prepared, the presence of often unknown impurities can complicate structure determinations, particularly when using infrared. In photolytic reactions with $F_2$, impurities present in the fluorine can obscure the reaction course. Some of these impurities such as HF are easily removed. Others can be condensed out. However, due to the high vapor pressure of $F_2$ at liquid nitrogen temperatures, about $2.7 \times 10^4$ Pascals (200 torr), it is not easy to separate many of the gaseous impurities from fluorine.

Perhaps the most elegant separation, based on fractional distillation, has been at the Argonne National Laboratory's Chemical Engineering Division. There they have built a rather large still, capable of yielding fluorine of > 99.9% purity. However, such a system is expensive, complex, and possibly dangerous. Having considerable volumes of yellow liquid fluorine bubble away could present severe health problems.

Another approach to the purification problem is to utilize the chemical oxidation potential of fluorine rather than its physical properties as used in fractional distillation. If a compound containing an element in a higher valence state could be formed which would decompose upon heating to regenerate fluorine, purification from many difficultly separable gaseous impurities could be achieved.

For practicalities sake, several criteria must be met:
1. The element oxidized must be relatively cheap. Pt, Ir, and the like would not be suitable.
2. The compound should be nonvolatile at operating temperatures. Obviously, the material would move out if sublimable.
3. The compound should decompose somewhere below 500° C if extensive corrosion of nickel containers is to be avoided. Consideration of these criteria led to a study of the formation of the heavier alkali complexes of nickel (IV). I believe the first to be reported was that of dipotassium nickel hexafluoride by Klemm and Huss in 1949. Since then, other similar compounds containing cesium and rubidium have been prepared and characterized. Such compounds, particularly with potassium, meet the first two criteria given above. They are both relatively cheap and also nonvolatile. Unfortunately, a study of the cesium, rubidium, and potassium compounds show that the free energy of the decomposition is far to the left to satisfy the third criterion, that of a reasonable pressure of fluorine at 500° C. An attempt was made to increase the attainable fluorine pressure by lowering the stability of the Ni(IV) salt by substituting sodium for part of the heavy alkalis. Apparently, no compound containing a heavy alkali metal with sodium was found; no increase in the pressure of fluorine was found over that with $K_2NiF_6$.

I have discovered the answer to the problem lies in the product of the decomposition reaction of the Ni(IV) salt. The least stable of the three heavy alkalis in a 2:1 ratio proved to be $K_2NiF_6$. At 500° C there was a < 90 torr pressure of $F_2$. If the reaction is written

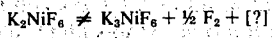

$$K_2NiF_6 \neq K_3NiF_6 + \tfrac{1}{2} F_2 + [?]$$

it becomes apparent that a balanced equation is difficult to obtain. The product is purple, presumably $K_3NiF_6$ containing Ni(III), as reported by Bode and Boss 1957. It was found that a dramatic and useful increase in the $\Delta G$ of the reaction

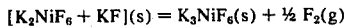

$$[K_2NiF_6 + KF](s) = K_3NiF_6(s) + \tfrac{1}{2} F_2(g)$$

was achieved by simply adding one extra mole of potassium fluoride per mole of $K_2NiF_6$. The shift in free energy is such that decomposition pressures of 19,000 torr ~ 400° C have been achieved compared to less than 30 torr in the absence of the excess mole of potassium fluoride. We postulate the reaction

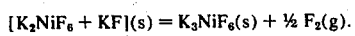

$$[K_2NiF_6 + KF](s) = K_3NiF_6(s) + \tfrac{1}{2} F_2(g).$$

2. Prior Art

To the inventor's knowledge there is no closely related prior art. However, the compound potassium nickel fluoride has been reported in various papers, and in particular, Mellor's Treatise, pages 65 and 67.

The inventor is aware that Argonne National Laboratory has built a complex fractional distillation plant which is capable of yielding fluorine of greater than 99.9% purity. Such a plant was most expensive and has been difficult to operate (see page 2 of this specification). In contrast, the system and method of this invention concerns an inexpensive system which obtains the same result, that is 99.9+% pure fluorine gas.

SUMMARY OF THE INVENTION

A simple, inexpensive system for purifying and storing pure fluorine has been discovered. The method utilizes alkali metal-nickel fluorides to absorb tank fluorine forming nickel-fluoride complex salts and leaving the gaseous impurities which can be removed by pumping. The complex nickel-fluoride is then heated to evolve pure gaseous fluorine.

DESCRIPTION OF THE PREFERRED EMBODIMENT

A nickel can filled with 3:1 mole ratio mixture of KF to $NiF_2$ is connected to a source of impure tank fluorine gas and a vacuum pump. The can is surrounded by a furnace. Initially, three moles of $NiF_2$ is mixed with 9 moles of KF and the material is intimately ground together before placing in an all-nickel heliarc welded can of 850 ml capacity. Tank fluorine at up to $10^6$ Pa (10 atmospheres) is added while slowly heating up to 500° C. The can temperature is then lowered to 250° C while tank $F_2$ is added to maintain a several atmosphere pressure. After the first two or three heating and cooling cycles are carried out, the device can be used for $F_2$ generation. At 225°, the pressure of $F_2$ gas is negligible and the system can be evacuated. It is then heated to 400° C whereupon the pressure of fluorine is of the order of $2 \times 10^6$ Pa (or ~ 20 atmospheres). In practice a similar empty nickel can is attached to the line and filled with the fluorine from the salt decomposition. It is then valved off for use elsewhere. Tank fluorine is added again to the can containing the nickel salt at 250°–300° C at which temperatures it is rapidly absorbed in a matter of hours. After absorption slows down or stops, the temperature is lowered to 225° C and the system evacuated to remove the concentrated impurities from the tank fluorine. At this point, a fresh preparation of pure fluorine is made by reheating to 400° C.

No loss in efficiency was noted after ten cycles or more. Further, low pressure fluorine of a hundred torr or less from a large tank can be "compressed" by going through such an absorption-decomposition cycle to give $2 \times 10^6$ Pa (20 atmospheres) of pure fluorine at 400° C.

What I claim is:

1. An improved method of preparing 99.9+% pure fluorine comprising the steps of:
   a. grinding a 3:1 mole ratio mixture of KF to $NiF_2$ to form an absorbent mixture and filling a nickel can container with said mixture;
   b. adding impure fluorine at superatmospheric pressure up to 10 atmospheres while slowly heating up to 500° C at which temperature the fluorine is rapidly absorbed to form nickel fluoride complex salts and thereafter lowering the container temperature to 250° C while additional impure fluorine is added to maintain a several atmosphere pressure;
   c. repeating at least twice the heating and cooling cycles of step (b);
   d. after the absorption of the elemental fluorine stops, the temperature is lowered to 225° C and the system evacuated to remove the concentrated impurities from the impure fluorine;
   e. after the step of evacuation, the system is then heated to approximately 400° C, whereupon the pressure is of the order of 20 atmospheres, to cause the nickel fluoride complex salts to decompose and evolve pure fluorine gas.

* * * * *